United States Patent [19]

Lieffers

[11] 4,244,190
[45] Jan. 13, 1981

[54] PROCESS FOR INTEGRATING TREATMENT OF AND ENERGY DERIVATION FROM GEOTHERMAL BRINE

[75] Inventor: William C. Lieffers, Fullerton, Calif.
[73] Assignee: Union Oil Company of California, Brea, Calif.
[21] Appl. No.: 953,644
[22] Filed: Oct. 23, 1978
[51] Int. Cl.³ .............................................. F03G 7/00
[52] U.S. Cl. ..................................................... 60/641
[58] Field of Search ......................................... 60/641

[56] References Cited

U.S. PATENT DOCUMENTS

| | | |
|---|---|---|
| 3,782,468 | 1/1974 | Kuwada . |
| 3,862,545 | 1/1975 | Ellis et al. . |
| 4,026,111 | 5/1977 | Matthews . |
| 4,088,743 | 5/1978 | Haas et al. . |
| 4,120,158 | 10/1978 | Sheinbaum ............................ 60/641 |
| 4,138,851 | 2/1979 | Rogers .................................. 60/641 |

OTHER PUBLICATIONS

Einarsson et al., "Disposal of Geothermal Waste Water By Reinjection", *Proceedings, 2nd U.N. Symposium on the Development and Use of Geothermal Resources*, May 1975, vol. 2, pp. 1349–1363.
Finney, "The Geysers Geothermal Power Plant", *Water–1972, AIChE Symposium Series*, No. 129, vol. 69, pp. 459–464.
Kuwada, "Pollution Control for Geothermal Power Plants", *Water–1973, AIChE Symposium Series*, No. 136, vol. 70, pp. 772–776.
Owen, "Precipitation of Amorphous Silica from High–Temperature Hypersaline Geothermal Brines", Lawrence Livermore Laboratory, University of California, ERDA Contract No. W–7405–Eng–48, Jun. 1975, pp. 1–20.
Wilson, "Environmental Aspects of the Multi-Purpose Development of Geothermal Resources", *Water–1973, AIChE Symposium Series*, No. 38, vol. 70, pp. 782–784.
Wilson et al., "Removal of Hydrogen Sulfide from Simulated Geothermal Brines by Reaction with Oxygen", Dow Chemical Company, Texas Division, Prepared for U.S. Energy Research and Development Administration, Apr. 1977, pp. 1–54.
"New Process Converts Geothermal Hydrogen Sulfide Into Sulfur", *Chemical Week*, Jun. 11, 1975, p. 39.
Allen et al., "Abatement of Hydrogen Sulfide Emissions from Geysers Geothermal Power Plant", *Proceedings, 2nd U.N. Symposium on the Development and Use of Geothermal Resources*, May 1975, vol. 2, pp. 1313–1315.
Axtmann et al., "Geothermal Chemical Engineering", *AIChE Journal*, vol. 22, No. 5, Sep. 1976, pp. 817–828.

*Primary Examiner*—Allen M. Ostrager
*Attorney, Agent, or Firm*—Dean Sandford; Daniel R. Farrell

[57] ABSTRACT

A process for treating and deriving useful energy from a two-phase geothermal brine containing non-condensible gases, including hydrogen sulfide, and also containing heavy and/or transition metals in solution, wherein the non-condensible gases are separated from the geothermal brine. Substantially all of the hydrogen sulfide contained in the non-condensible gas is converted to sulfur dioxide and at least a portion of the sulfur dioxide is removed from the non-condensible gas thereby rendering the same environmentally acceptable for discharge. The separated geothermal brine is flashed to a high quality steam utilized for energy derivation. The portion of sulfur dioxide removed from the non-condensible gas is added to the remaining brine for reinjection into the subterranean geothermal reservoir.

27 Claims, 8 Drawing Figures

4,244,190

PROCESS FOR INTEGRATING TREATMENT OF AND ENERGY DERIVATION FROM GEOTHERMAL BRINE

BACKGROUND OF THE INVENTION

This invention relates to the utilization of geothermal energy, and more particularly to a process for deriving useful energy from geothermal brines.

In light of the problem of diminishing hydrocarbon fuel reserves, there is a developing emphasis to exploit alternative energy sources, such as geothermal energy. Geothermal energy is generated by producing steam, hot water, or hot aqueous brines from a subterranean geothermal reservoir and utilizing the produced fluid in conjunction with surface equipment, such as turbines and heat exchangers, to derive useful energy therefrom.

Most commercially exploited hot aqueous geothermal brines produced from subterranean geothermal reservoirs contain appreciable quantities of non-condensible gases, such as hydrogen sulfide and carbon dioxide. Not only will hydrogen sulfide create precipitation, scaling and corrosion problems within the treatment or power generation systems, but only very minute amounts of hydrogen sulfide can be acceptably discharged into the atmosphere. Also, as carbon dioxide is depleted from a subterranean geothermal reservoir, the partial pressure of carbon dioxide also decreases. Thus, when geothermal brines are produced from the reservoir, the reduced carbon dioxide partial pressure on the brine remaining in the reservoir causes the chemical equilibrium to shift so as to favor carbonate formation. As a result, carbonate scaling of the well and process piping and equipment occurs, usually as calcium carbonate scale.

Against this setting, several processes have been proposed for utilizing geothermal brine. One such process proposes to first withdraw and suitably treat non-condensible gases from geothermal brine and then flash the brine to steam. The remaining "waste" brine is reinjected into the subterranean geothermal reservoir. The steam is utilized to drive a turbine and then cooled and condensed in surface condensers. Substantially all of the hydrogen sulfide present appears with the non-condensibles in the exhaust vent from the after condensers and is converted to sulfur by any available process, such as the Stretford process. The steam may be scrubbed with condensate at a location upstream from the turbine to remove mineral impurities as well as some ammonia and hydrogen sulfide. The condensate can be disposed of by reinjection with the "waste" brine. However, it is noted that silica contained in the steam fed to a turbine deposits on the turbine blades necessitating turbine shutdown for cleaning, and that precipitated dissolved solids must be removed from waste waters before reinjection to prevent plugging of the reinjection wells.

Another proposed process utilizes the addition of oxygen to produced geothermal brines prior to entry into the first wellhead flash vessel to oxidize sulfide present in the geothermal brine to free sulfur or sulfate ion and further, to divert reinjection to a waste pond so as to remove silica solids prior to reinjection. It has also been proposed to treat vent gas from surface condensers to remove hydrogen sulfide therefrom by passing the gas through a reactor containing a packed bed of vanadium catalyst thereby converting hydrogen sulfide to sulfur dioxide which may then be discharged to the atmosphere. Still another prior art process discloses removing non-condensible gases, including carbon dioxide, from produced geothermal water, compressing the non-condensible gases and utilizing these gases as a gas lift to aid in production of the geothermal water. The carbon dioxide helps maintain chemical equilibrium in the water and thereby prevents, inter alia, calcium carbonate formation. However, none of these prior art processes offer a comprehensive process for deriving useful energy from the produced geothermal brine and concomitantly treating the brine to effectively eliminate scaling and corrosion associated therewith. Thus, a need exists for such a process.

Accordingly, it is an object of the present invention to provide a process for efficiently deriving useful energy from produced geothermal brine which will at the same time effectively and substantially eliminate attendant scaling and corrosion.

Another object of the present invention is to provide a process for deriving useful energy from geothermal brines in a substantially pollution-free manner.

A further object of the present invention is to provide a process for deriving useful energy from produced geothermal brine in which waste water can be efficiently reinjected into a subterranean geothermal reservoir in a manner which is not deleterious to the reinjection piping and well, nor to the geothermal brine within the reservoir.

These and other objects and advantages of the invention will be apparent from the following detailed description and drawing.

SUMMARY OF THE INVENTION

A process for treating and deriving useful energy from two-phase geothermal brine containing non-condensible gases, such as hydrogen sulfide and carbon dioxide, and also containing barium, silica and/or heavy and/or transition metals in solution, wherein an oxidant is added to the geothermal brine, produced as a two-phase fluid, in an amount sufficient to oxidize the sulfide to an intermediate oxidation state. Thereafter, the brine is separated into a liquid phase and a gaseous phase and the liquid phase is flashed to high quality steam. This high quality steam is separated from the remaining liquid phase, scrubbed with a liquid to remove deleterious brine constituents therefrom and utilized to operate a suitable turbine, being condensed during such operation. The gaseous phase, i.e., non-condensible gases and steam, is cooled thereby condensing a portion of the steam which is subsequently separated from the cooled gaseous phase. The cooled gaseous phase is then contacted with a liquid to remove any deleterious brine constituents, for example, sodium chloride, and a portion of the hydrogen sulfide therefrom. The remaining hydrogen sulfide present in the gaseous phase is converted to sulfur dioxide. Substantially all of the sulfur dioxide is removed, and steam condensed, from the gaseous phase prior to discharge thereof to the atmosphere as substantially sulfur dioxide-free non-condensible gases. The condensate formed during cooling of the gaseous phase and the liquid containing deleterious brine constituents and hydrogen sulfide are combined prior to contacting the same with a stoichiometric excess of sulfur dioxide, formed as aforedescribed, thereby producing soluble sulfur compounds. Subsequently, this mixture is added to the remaining liquid phase for reinjection into a subterranean geothermal reservoir as a two-phase fluid. The temperature of the liquid phase and mixtures therewith must be maintained above the temperature required to keep amorphous silica in solution.

After conversion of the hydrogen sulfide present in the gaseous phase to sulfur dioxide, it may be desirable to add the sulfur dioxide-containing gaseous phase directly to the remaining liquid phase for reinjection into a subterranean geothermal reservoir as a two-phase fluid. In this manner, carbon dioxide present in the gaseous phase serves to maintain a sufficient partial pressure in the reinjected two-phase fluid to prevent carbonate scaling upon injection of the two-phase fluid. Also, the carbon dioxide lowers the pH of the injected two-phase fluid thereby retarding the rate of any silica deposition which might occur in the well bore or subterranean geothermal reservoir during reinjection.

In certain instances, it may be undesirable to inject sulfur dioxide into a subterranean geothermal reservoir, since sulfur dioxide may be reduced therein and, as a consequence, hydrogen sulfide may be formed and eventually produced from the subterranean geothermal reservoir. Under such circumstances, a large portion of the hydrogen sulfide present in the gaseous phase is converted to sulfur. After molten sulfur is separated from the remaining gaseous phase, the portion of hydrogen sulfide present in the remaining gaseous phase is converted to sulfur dioxide. Substantially all of the sulfur dioxide is scrubbed from the gaseous phase, and the two-phase fluid is then reinjected, all as previously described. In this manner, the sulfur dioxide content of the reinjected two-phase fluid is sufficiently lowered to effectively minimize any in situ hydrogen sulfide formation resulting from reinjection.

BRIEF DESCRIPTION OF THE DRAWING

The invention will be more readily understood by reference to the accompanying drawings, in which like numerals refer to like elements, and in which.

DETAILED DESCRIPTION

Figure 1:
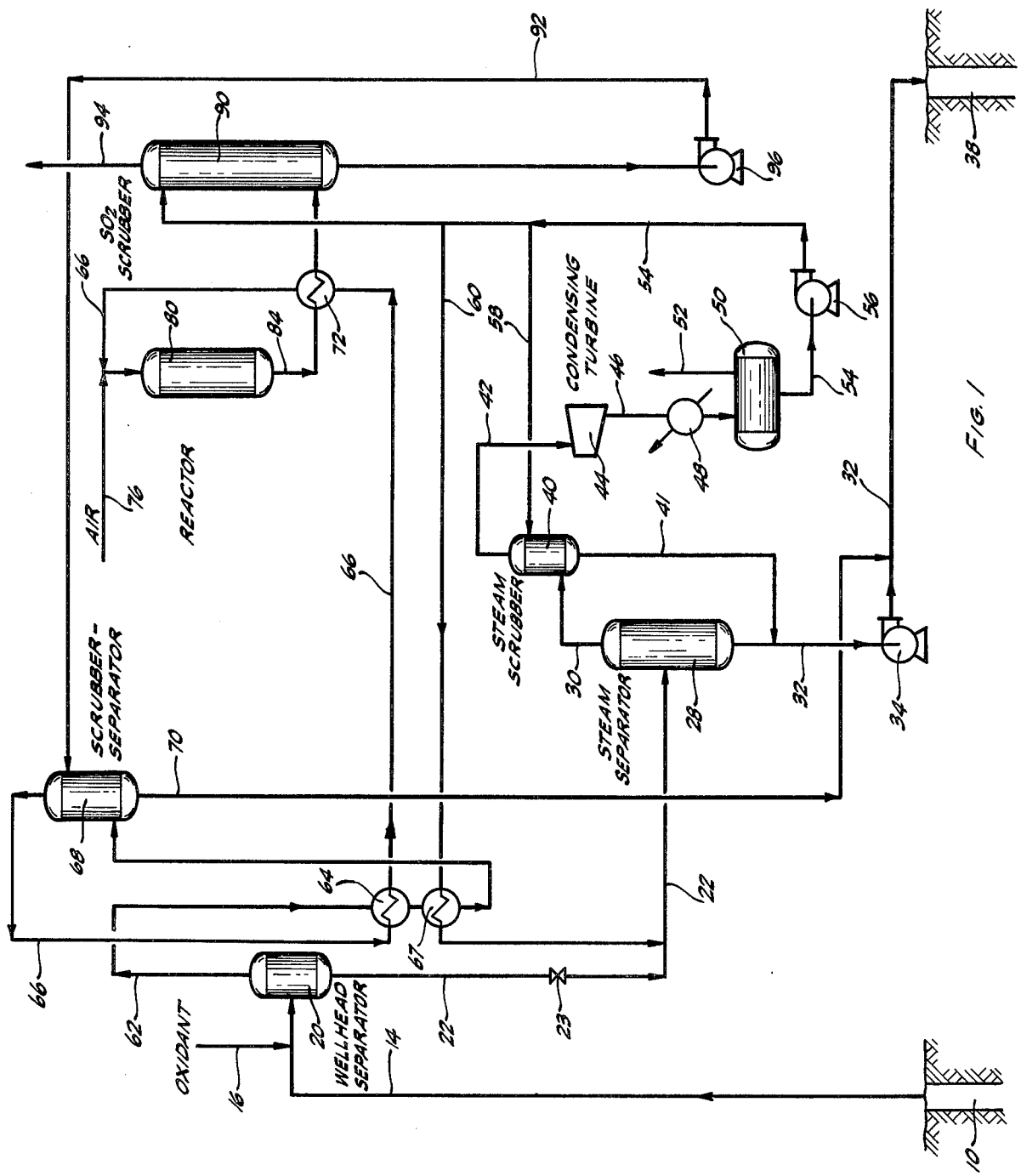
FIG. 1 is a schematic flow diagram of one embodiment of the energy derivation and treatment process of the present invention.

Referring now to FIG. 1, geothermal brine is produced as a two-phase fluid from a subterranean geothermal reservoir to the surface via wells communicating with the reservoir, such as well 10. The geothermal brine is usually produced at a temperature of about 250° F. to 750° F. The pressure at which the geothermal brine is produced will vary dependent on, inter alia, the reservoir and the flow rate at which the brine is produced. An example of a typical composition of the liquid phase of a produced geothermal brine is given in Table 1.

TABLE 1

| Constituent | Concentrating ppm | Constituent | Concentration ppm. |
|---|---|---|---|
| Sodium | 27,500 | Boron | 147 |
| Potassium | 5,510 | Iron (Ferrous) | 143 |
| Lithium | 137 | Manganese | 252 |
| Calcium | 7,410 | Silver | 0.1 |
| Magnesium | 48 | Lead | 1.3 |
| Barium | 528 | Zinc | 14 |
| Strontium | 497 | Arsenic | 4.2 |
| Chloride | 66,800 | $CO_2$ as $HCO_3$ | 44 |
| Sulfide | 0.6 | Silica | 800 |

The liquid phase of the produced geothermal brine usually contains heavy and/or transition metal ions such as silver, copper, lead, zinc, manganese and iron, and may also contain large amounts of silica in solution. As employed throughout this specification, the terms "heavy metals" and "heavy metal ions" are meant to include metals having a density greater than 4 and the ions thereof. Examples of heavy metals are manganese, iron, copper, silver, lead and zinc. "Transition metals" and "transition metal ions" as used throughout the specification denote elements having partially filled d and f electron orbital shells and the ions thereof. Specifically, "transition metals" and "transition metal ions" are intended to include elements 21 through 29 (scandium through copper), 39 through 47 (yttrium through silver), 57 through 79 (lanthanium through gold), and all known elements from 89 (actinum) and above and the ions thereof. Examples of transition metals commonly found in geothermal brine include manganese, iron, copper and silver. As is readily apparent, "transition metals" and "heavy metals" are not mutually exclusive terms.

The gaseous phase of the produced geothermal brine is usually comprised of primarily steam and a relatively low concentration of non-condensible gases. As an example, a typical wellhead gaseous phase will have a steam to non-condensible gases mole ratio of at least 6:1. The steam will usually contain a relatively low concentration of ammonia (e.g. approximately 0.03 wt.%). As used throughout this specification, the term "non-condensible gases" refers to those gases which cannot be liquefied under the conditions encountered in the process. An example of a typical composition of the non-condensible gas portion of the gaseous phase is set forth in Table 2.

TABLE 2

| Constituent | Concentration Mole % |
|---|---|
| Carbon Dioxide | 97.77 |
| Methane | 2.0 |
| Hydrogen Sulfide | 0.2 |

TABLE 2-continued

| Constituent | Concentration Mole % |
|---|---|
| Hydrogen | 0.03 |

Typically, a majority of both the carbon dioxide and hydrogen sulfide present in the produced geothermal brine exist in the gaseous phase at wellhead conditions.

The produced geothermal brine is transported to wellhead separator 20 via conduit 14. An oxidant is added via conduit 16 to the geothermal brine flowing through conduit 14. The oxidizing agent can be added to the produced geothermal brine by any suitable means such as, for example, an injection nozzle (or plurality thereof) which extends into conduit 14. The oxidant is employed to oxidize hydrogen sulfide present in the produced geothermal brine so as to substantially eliminate any corrosion or scaling effects associated with hydrogen sulfide. Gaseous oxygen is the preferred oxidant since the oxygen preferentially reacts with the hydrogen sulfide present in the brine thereby engaging in fewer peripheral reactions with, for example, ferrous ions present in the brine. Any available source of gaseous oxygen, such as air or commercially available tonnage oxygen, may be employed in the process of the present invention, although air is the preferred source of gaseous oxygen due to its low cost and availability.

If barium ions are present in the produced geothermal brine, it is desirable to oxidize the sulfides present therein to intermediate oxidation states, such as sulfur and sulfite, and preferably thiosulfate. This becomes necessary because complete oxidation of sulfide results in the formation of sulfate which will combine with barium ions present in the brine to form barium sulfate, an insoluble precipitate. If no preventive measures are initiated, barium sulfate will rapidly scale process piping and equipment and inevitably plug the same. Partial oxidation is achieved by adjusting the molar ratio of oxygen injected into the brine to hydrogen sulfide present in the brine below that molar ratio at which complete oxidation is achieved. As evident to the skilled artisan, when barium is not a constituent of the produced geothermal brine, the sulfides may be completely oxidized to sulfate. Also, a small amount of barium may be tolerated in the geothermal brine if the amount of barium sulfate formed is soluble in the geothermal brine.

Further, care must be taken to insure against intense mixing of the two-phase brine mixture before oxidation of the sulfides contained therein. If such mixing occurs (e.g., when a static mixer is utilized), iron pyrites will form and rapidly scale the process piping and equipment. Since a lesser amount of mixing is necessary to insure that the maximum reaction possible occurs, it has been determined that iron pyrites will not form when a plurality of orifice plates (e.g., 3 or 4 creating 5 psig pressure drop) or elbows in the process piping prior to the point of injection of the oxidant into the brine are utilized to mix the two phases.

Since oxygenated brine is highly corrosive to the process piping and equipment utilized in the process of the present invention, the portion of the process piping and equipment which the oxygenated brine contacts should be constructed of an alloy metal which is resistant to such corrosion or should be coated with a corrosion resistant material. An example of a suitable alloy is a titanium alloy, and a suitable corrosion resistant coating is CorReco 700, a phenol mercaptide marketed by Corrosion Research Company, Inc. of Camas Valley, Oreg. In light of the fact that substantially all of the air injected during the process described herein is removed from the geothermal brine in the first wellhead separator along with steam and the non-condensible gases, normally it will be sufficient to construct only the wellhead separator and production piping and equipment leading thereto with such a corrosion resistant alloy. The extent to which process piping and equipment will have to be so constructed will be evident to the skilled artisan cognizant of oxygen concentration throughout the process flow scheme.

After the oxidant is injected into the produced geothermal brine, the brine is transported via conduit 14 to wellhead separator 20 wherein the gaseous phase of the geothermal brine is separated from the liquid phase. The wellhead separator 20 may be any conventional gas-liquid separator which will satisfactorily separate the gaseous and liquid phases of the particular geothermal brine.

The liquid phase is drawn off near the bottom of wellhead separator 20 via conduit 22 and transported therein to steam separator 28 which may be any conventional gas-liquid separator. While transported in conduit 22, the liquid phase flows through a conventional control valve 23 which creates a substantial pressure drop in the liquid phase such as, for example 300 psi, thereby flashing a portion of the liquid phase to a high quality steam. The fluid is then introduced into separator 28 wherein the high quality steam exits near the top of separator 28 via conduit 30. As employed herein, the term "high quality" steam refers to steam having a relatively high weight fraction of vapor. The remaining liquid phase brine is withdrawn from the bottom of separator 28 via conduit 32 and is pressurized by any suitable means, such as pump 34, to a pressure sufficient to reinject the brine via wells, such as injection well 38, into the subterranean geothermal reservoir. The high quality steam in conduit 30 enters scrubber 40 and is scrubbed by countercurrently downflowing scrubber liquid (hereinafter described) to remove deleterious brine constituents entrained therein. "Deleterious brine constituents" denote those constituents of the liquid phase of the produced geothermal brine which are entrained in a vapor phase, here the high quality flashed steam, and which will create processing problems in downstream piping and equipment, such as turbine 44. As an example, sodium chloride entrained in the high quality steam will corrode the blades of turbine 44 and will scale surface condenser 48. Spent scrubber liquid exits the bottom of steam scrubber 40 via conduit 41 and is added to the liquid phase brine in conduit 32. The scrubbed steam exits the top of scrubber 40 via conduit 42 and is transported to condensing turbine 44. Turbine 44 drives an electrical generator (not illustrated) thereby generating electrical power. The exhaust from turbine 44 is transported via conduit 46 to a surface condenser 48 where it is heat exchanged with coolant to cool the exhaust steam and thereby condense substantially all of the steam. The condensate is then transported via conduit 48 to surge drum 50. Any remaining non-condensible gases are withdrawn via conduit 52 and vented to the atmosphere in any conventional manner. Alternatively, a direct contact condenser, not shown, in which the steam exhausted from turbine 44 is directly contacted with the coolant can be employed instead of surface condenser 48.

The cooled steam condensate in surge drum 50 consists essentially of water with an almost negligible trace amount of initial brine constituents. This condensate is drawn off the drum 50 via conduit 54 and pressurized by any suitable means, such as pump 56. A portion of the condensate in conduit 54 is drawn off via conduit 58 and utilized as the scrubber liquid in steam scrubber 40. Another portion of the condensate in conduit 54 flows through conduit 60 and is heated and vaporized by the gaseous phase in conduit 62 in any suitable manner such as by indirect heat exchange in heat exchanger 67. The vaporized condensate is added to the flashed liquid phase brine in conduit 22 to supplement the amount of steam which is separated from the liquid phase brine in separator 28. The remaining condensate in conduit 54 is utilized as the scrubber liquid in sulfur dioxide scrubber 90, as hereinafter described.

The gaseous phase separated from the liquid brine phase in separator 20 is withdrawn from near the top of separator 20 via conduit 62 and passed in heat exchange relationship with the reactor feed gas in conduit 66 and steam condensate in conduit 60 in any suitable manner, such as by utilizing heat exchangers 64 and 67 respectively. Optionally, the gaseous phase can be further cooled by heat exchange with cooling tower water in a condensor, not shown. As a result of such heat exchange, a substantial portion of the steam contained in the gaseous phase in conduit 62 is condensed thereby reducing the gas volume to be treated to about 5 to 10 percent of the original volume of the gaseous phase. Thereafter, the gaseous phase and condensate in conduit 62 is introduced into scrubber-separator 68 wherein the condensed steam, withdrawn near the bottom of scrubber-separator 68, is transported via conduit 70 and added to the brine in conduit 32 for reinjection into the subterranean geothermal reservoir. Also, the remaining steam and non-condensible gases are countercurrently scrubbed with spent sulfur dioxide scrubber liquid which is transported in conduit 92 and introduced into scrubber-separator 68 near the top thereof. The scrubber liquid removes liquid condensate and any deleterious brine constituents, such as chlorine, which may be entrained in the gaseous phase and will absorb a small amount of the non-condensible gases. Sulfur dioxide in the spent scrubber liquid reacts with any hydrogen sulfide absorbed from the non-condensible gases. As a result, some elemental sulfur is formed, inter alia, and therefore, measures must be taken to ensure against solidification of elemental sulfur and resultant plugging of process piping and equipment. As an example, if the temperature of the condensate and brine is just above the melting point of elemental sulfur, conduits 70 and 32 may be insulated along their entire length thereby maintaining the temperature of the condensate and brine in these conduits above the melting point of elemental sulfur (approximately 260° F.). If the temperature of the condensate and brine is at or below the melting point of elemental sulfur, conduit 70 may be heated by any suitable means, such as a steam heater (not illustrated) to a temperature above the melting point of elemental sulfur. If a portion of the spent sulfur dioxide scrubber liquid in conduit 92 can adequately scrub the remaining steam and non-condensible gases in scrubber-separator 68, it is desirable to utilize such a portion since the condensate, brine mixture in conduit 70 will be at a higher temperature than if all the scrubber liquid in conduit 92 is utilized. If only a portion of the spent sulfur dioxide scrubber liquid is utilized in scrubber-separator 68, the remaining spent scrubber liquid may bypass scrubber-separator 68 and be added to the brine in conduit 32 for reinjection into the subterranean geothermal reservoir.

The steam and non-condensible gases, i.e. the reactor feed gas, removed overhead from scrubber separator 68 via conduit 66, are heated in heat exchangers 64 and 72 and combined with air introduced via conduit 76 prior to entry into reactor 80. Alternatively, air and feed gas may be separately introduced into the reactor through separate conduits (not illustrated) if any appreciable reaction would occur upon combination of air and feed gas. Air is added in an amount sufficient to provide at least 3 moles of oxygen per 2 moles of hydrogen sulfide so that sulfur dioxide is formed in accordance with reaction (1) hereinafter described. Preferably, air is added in an amount sufficient to provide a 50% molar excess of oxygen over the stoichiometric amount necessary to convert hydrogen sulfide to sulfur dioxide, since it has been found that such a molar excess will not affect the selective conversion of hydrogen sulfide to sulfur dioxide.

Reactor 80 contains a suitable catalyst bed which will oxidize hydrogen sulfide in the feed stream to sulfur dioxide, which is environmentally acceptable for discharge to the atmosphere in greater quantities than hydrogen sulfide. An example of a suitable catalyst is one comprising one or more vanadium oxides and/or sulfides supported on a high surface area amorphous silica-alumina base, as disclosed in U.S. Pat. No. 4,092,404 entitled "Catalytic Incineration of Hydrogen Sulfide from Gas Streams", by Robert H. Hass. Hydrogen sulfide is converted to sulfur dioxide in accordance with the following general reaction:

$$2H_2S + 3O_2 \rightarrow 2SO_2 + 2H_2O \qquad (1)$$

The water formed in accordance with the above reaction will be present as steam at the temperatures involved.

The reacted feed gas, i.e., the product gas, exits the bottom of reactor 80 via conduit 84 and heats the reactor feed gas in heat exchanger 72. The product gas is then introduced into sulfur dioxide scrubber 90 near the bottom thereof and is countercurrently scrubbed with steam condensate which is introduced from conduit 54 near the top of scrubber 90. The condensate removes a substantial portion of the sulfur dioxide from the product gas, for example 95%, condenses substantially all of the steam present in the product gas and exits the bottom of scrubber 90 via conduit 92. The condensate is then pressurized by any suitable means, such as pump 96, and is conveyed to scrubber-separator 68. The scrubbed product gas exits near the top of scrubber 90 via conduit 94 as a cleaned vent gas stream. Alternatively, as the cleaned vent gas stream in conduit 94 contains a large volume of carbon dioxide, for example 99%, this stream may be transported to a suitable facility and utilized as a source of carbon dioxide.

Figure 2:
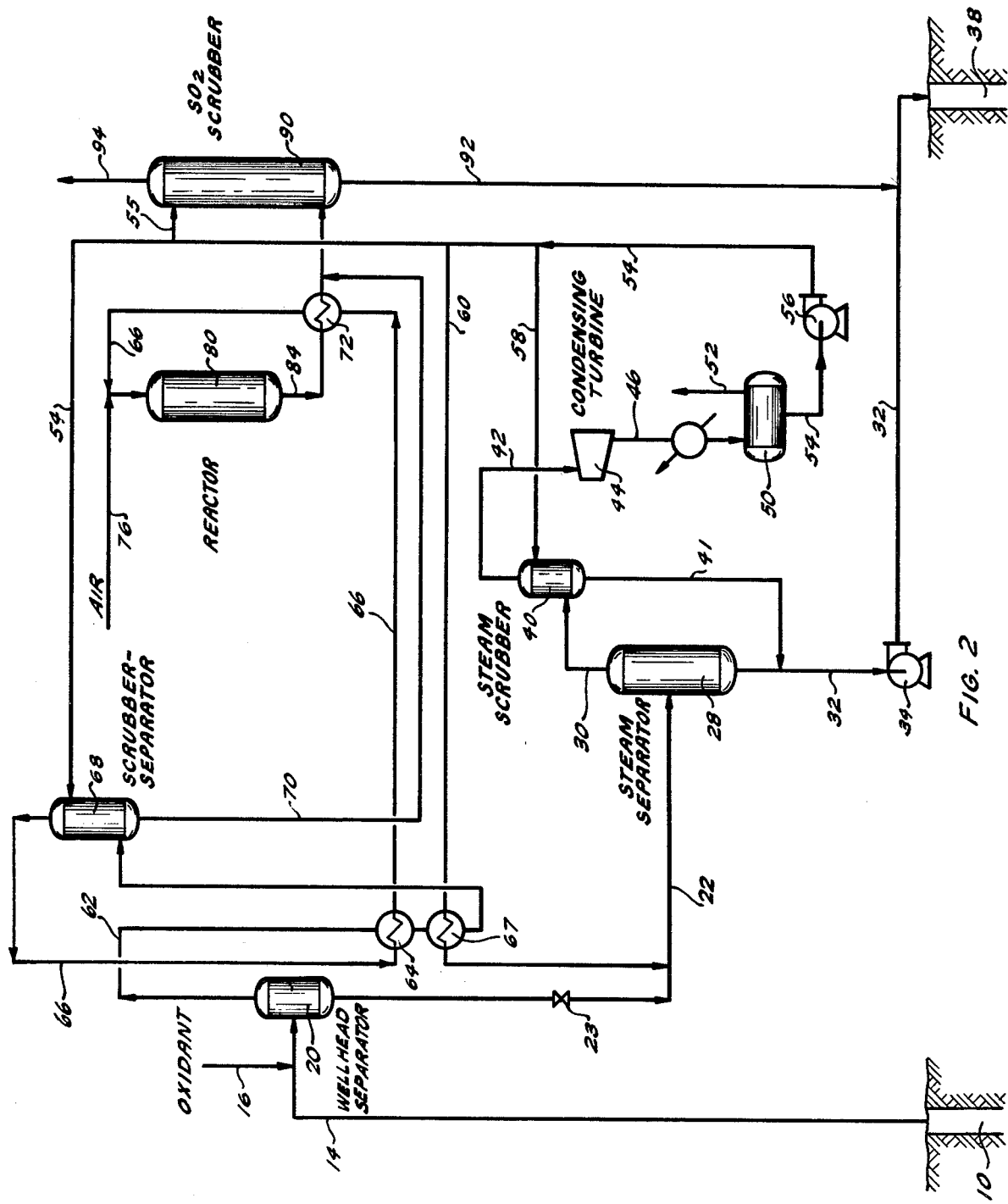
FIG. 2 is a schematic flow diagram of an alternative embodiment of the process of the present invention.

In another embodiment of the present invention as illustrated in FIG. 2, the process scheme is substantially identical to that illustrated in FIG. 1 except that steam condensate in conduit 54 is utilized to scrub deleterious brine constituents from steam and non-condensible gases in scrubber-separator 68. More specifically, a portion of steam condensate is withdrawn from conduit 54 via conduit 55 and introduced near the top of sulfur dioxide scrubber 90. The spent scrubber liquid transported in conduit 92 is added to the brine in conduit 32 for reinjection into the subterranean geothermal reservoir. The remaining steam condensate in conduit 54 is utilized as the scrubber liquid in scrubber-separator 68, as previously detailed. Since there is no sulfur dioxide present in the steam condensate, no reaction between sulfur dioxide and hydrogen sulfide occurs in scrubber-separator 68 and therefore the need to maintain conduit 70 at a temperature above the melting point of elemental sulfur is obviated. However, the spent scrubber liquid in conduit 70 from scrubber-separator 68 cannot be directly added to the brine reinjection stream in conduit 32, since the spent scrubber liquid contains a small amount of hydrogen sulfide which would react with the heavy and/or transition melts present in the brine conveyed in conduit 32 to form heavy and/or transition metal sulfide precipitates. Such precipitates could result in plugging of conduit 32. Therefore the spent scrubber liquid in conduit 70 is added to the product gas in conduit 84 thereby permitting the hydrogen sulfide in the spent scrubber liquid to react with sulfur dioxide in the product gas to form soluble sulfur products including, inter alia, elemental sulfur. This spent scrubber liquid is separated from the product gas in sulfur dioxide scrubber 90 and, along with spent sulfur dioxide scrubber liquid, is added to the brine reinjection stream in conduit 32. By such processing, no hydrogen sulfide is present in the combined liquids conveyed by conduit 92 and added to conduit 32 thereby eliminating any attendant scaling or corrosion of process piping or equipment. Alternatively, the spent scrubber liquid in conduit 70 may be introduced into the sulfur dioxide scrubber 90 above the point of product gas introduction therein (not illustrated) thereby allowing hydrogen sulfide present in the spent scrubber liquid to react with sulfur dioxide within scrubber 90. Again, suitable measures may be required to maintain the temperature of the spent scrubber liquid in conduit 70 and the brine to which the scrubber liquid is added in conduit 32 above the melting point of elemental sulfur (approximately 260° F.).

Figure 3:
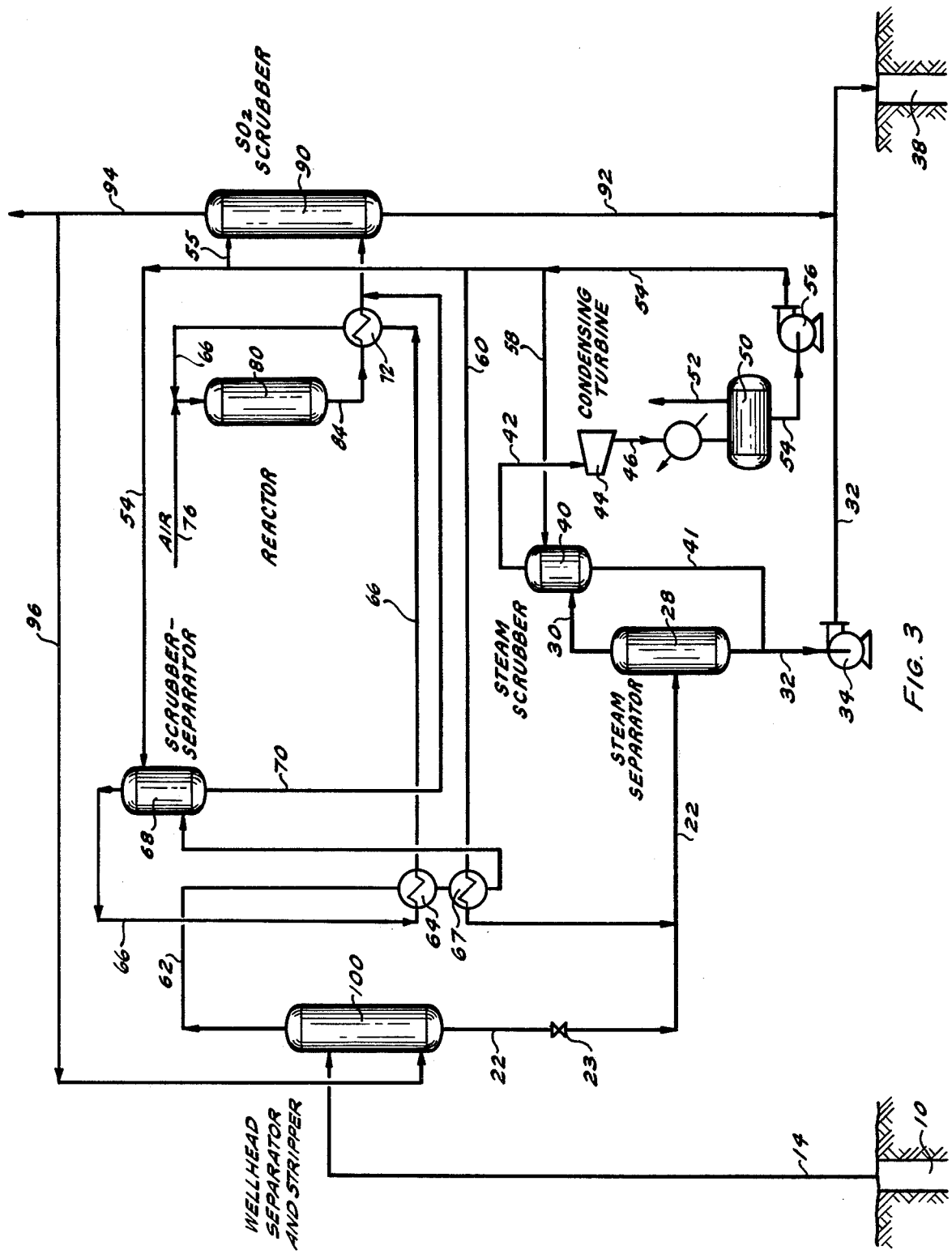
FIG. 3 is a schematic flow diagram of an alternative embodiment of the process of the present invention in which improved separation of the gaseous phase and liquid phase brine is achieved in the wellhead separator.

Another embodiment of the present invention is illustrated in FIG. 3 and, although utilized in conjunction with the process schematic of FIG. 2, as illustrated, it is equally applicable to the process schematic of FIG. 1 or other embodiments described herein. In this embodiment, produced geothermal brine is introduced into wellhead separator and stripper 100 near the top thereof in lieu of wellhead separator 20 illustrated in FIGS. 1 and 2. The non-condensible gases and steam are separated from the liquid phase of the geothermal brine, as previously described with respect to wellhead separator 20. This separated liquid phase then flows downwardly over a plurality of vapor-liquid contact means, such as contacting trays, positioned within wellhead separator and stripper 100. A portion of the cleaned vent gas stream 94 is transported via conduit 96 and introduced into wellhead separator and stripper 100 near the bottom thereof. This gas simultaneously flows counter-currently upwardly through the vapor-liquid contact devices in well-head separator and stripper 100 thereby removing substantially all of the non-condensible gases, including, inter alia, hydrogen sulfide, from the liquid phase. Therefore, since essentially no hydrogen sulfide is present in the liquid phase drawn off separator and stripper 100 via conduit 22, the need for adding an oxidant to the geothermal brine in conduit 14 is obviated.

It is intended that any other suitable inert stripping gas which is readily available could be utilized to augment the cleaned vent gas stream in this embodiment or be utilized in lieu of the vent gas stream, in any suitable manner as will be evident to the skilled artisan.

Figure 4:
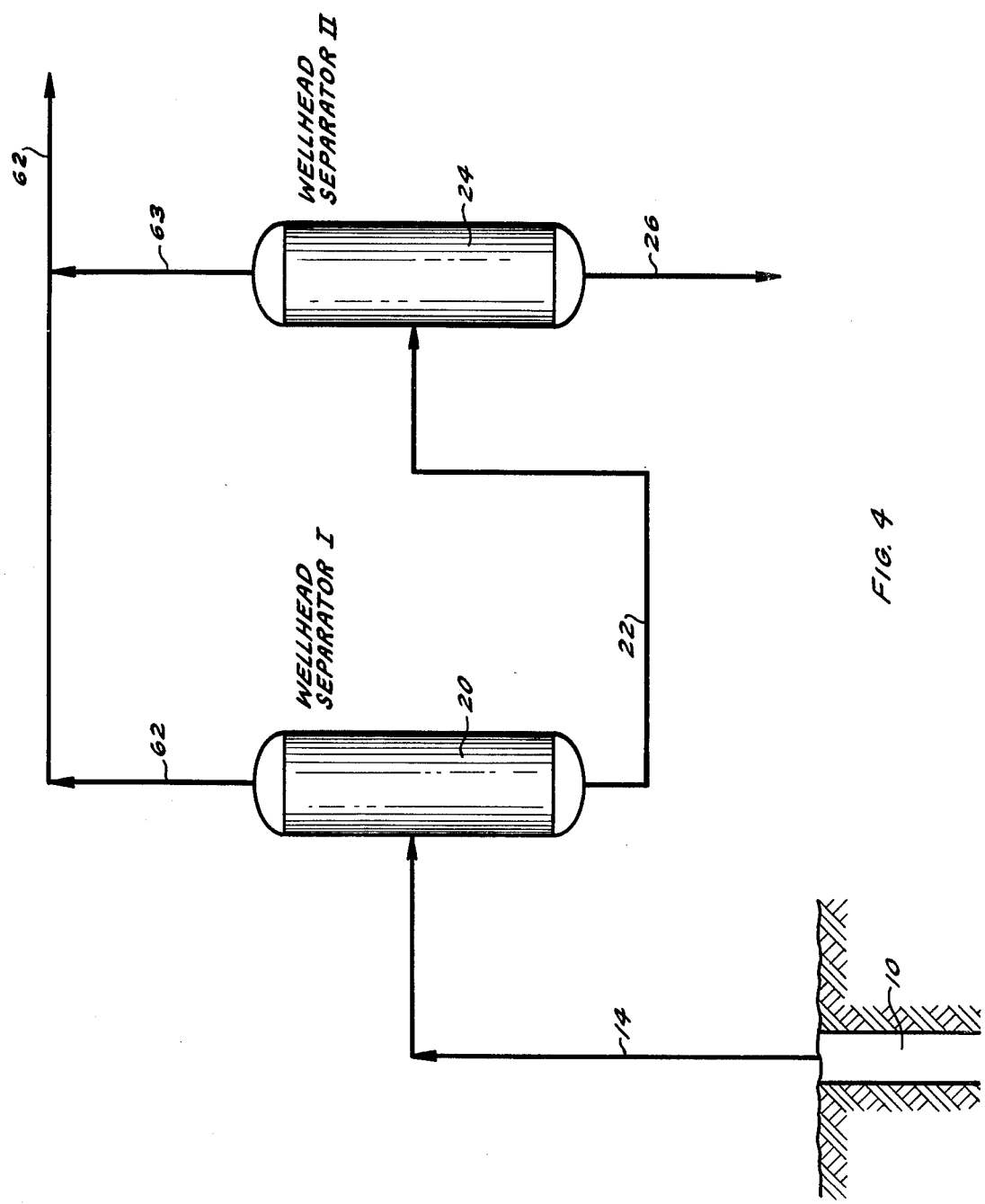
FIG. 4 is a schematic, partial flow diagram of an alternative embodiment of the process of the present invention wherein two wellhead separators are utilized.

Still another embodiment of the present invention is illustrated in FIG. 4 wherein the geothermal brine is produced from well 10 and transported via conduit 14 to the first wellhead separator 20. In this first wellhead separator, steam and non-condensible gases are separated from the liquid phase brine and exit near the top of the wellhead separator via conduit 62. Approximately 90% of the hydrogen sulfide originally present is removed from the liquid phase brine is wellhead separator 20 along with steam and other non-condensible gases. The liquid phase brine is drawn off near the bottom of wellhead separator 20 and is transported in a conduit 22 and introduced into a second wellhead separator 24 which is maintained at a lower pressure than separator 20. In this second wellhead separator, approximately 70% of the hydrogen sulfide present in the liquid phase brine introduced via conduit 22 is removed therefrom and is drawn off near the top of wellhead separator 24, along with steam and other non-condensible gases, through conduit 63. The gas stream is conduit 63 is combined with that in conduit 62 and the resultant stream is transported via conduit 62 for processing in any manner disclosed herein. The liquid phase brine is drawn off the bottom of wellhead separator 24 and also utilized in any manner disclosed herein. By removing almost the entire amount of hydrogen sulfide present in the liquid phase brine, the need for adding an oxidant to the geothermal brine in conduit 14 may be eliminated.

It should be noted that in all the embodiments of the present invention, the conduits which convey geomethermal brine containing silica, i.e., conduits 14, 22 and 32, must be maintained at a temperature which is above that temperature which is required to keep amorphous silica in solution. Usually, this will require that only suitable measures be taken with respect to maintaining the temperature of brine in conduit 32. As examples of suitable measures, the conduit may be insulated with a suitable material, such as a fiber-glass material, or may be heated at one or several locations by any suitable means.

Figure 5:
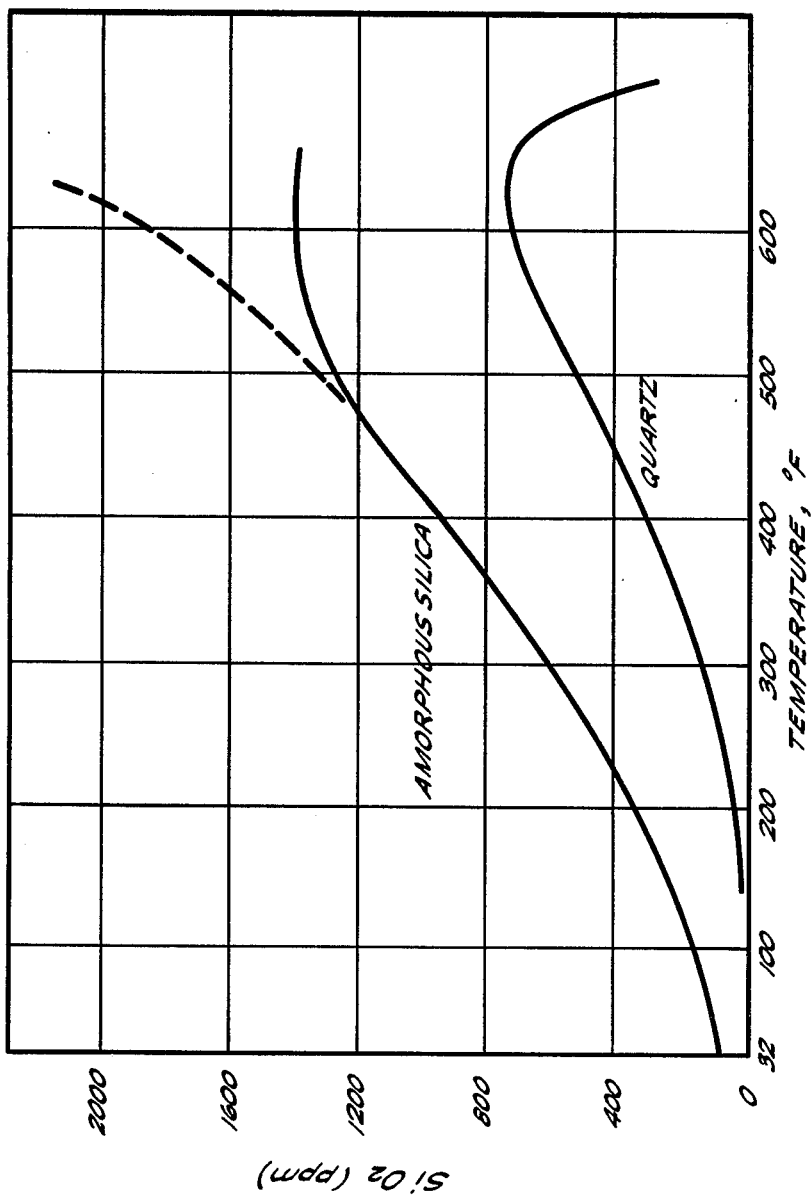
FIG. 5 is a graphical representation of amorphous silica and quartz solubility curves for silicon dioxide.

As present in geothermal brine within a subterranean reservoir, silica (silicon dioxide) is in equilibrium with quartz (crystalline silicon dioxide). As the geothermal brine is produced and utilized at the surface, the temperature of the brine steam to be reinjected may have dropped a predetermined amount before silica precipitates out of the brine as amorphous silica (a non-crystalline polymer of silicon dioxide). More specifically, as illustrated in FIG. 5 two solubility curves for silica in water are shown, one for silica in the form of quartz and another for amorphous silica. Comparable curves for the solubility of silica in brine are not available at present. However, these curves allow a qualitative analysis of the problem. As an example, silica in a subterranean geothermal brine reservoir at a temperature of 455° F. is expected to have an equilibrium concentration of about 400 ppm. As this brine is produced to and processed at the surface, the temperature thereof may drop to about 230° F. before silica begins to precipitate as amorphous silica. However, processing the brine will also reduce the quantity of the brine stream causing an increase in the concentration of silica and therefore, an increase in the temperature necessary to maintain silica in solution. The exact temperature drop of the produced brine which can be tolerated before suitable measures are initiated will be evident to the skilled artisan in possession of silica solubility curves for a particular geothermal brine who is aware of the geothermal reservoir temperature or silica concentration.

Figure 6:
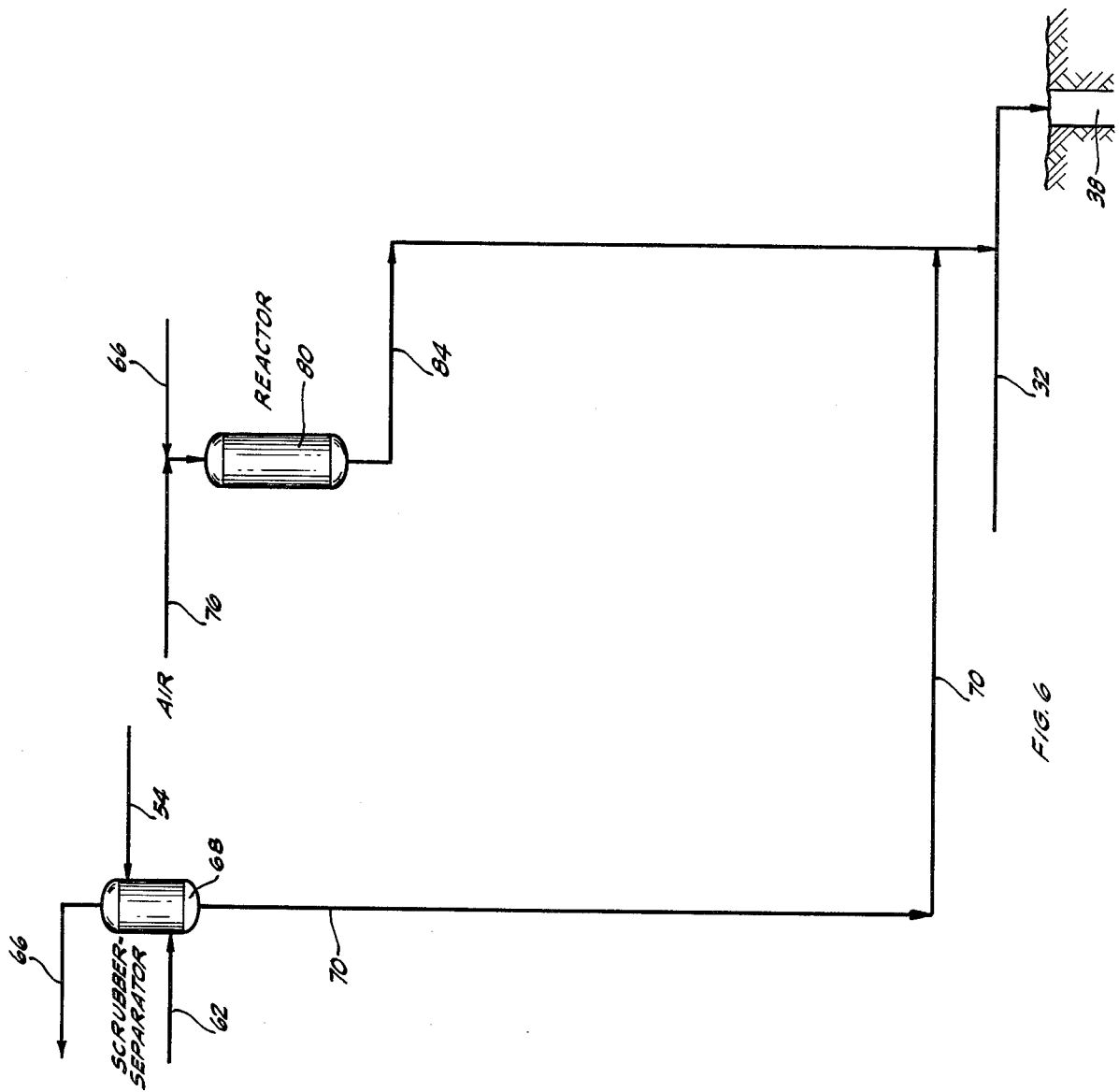
FIG. 6 is a schematic, partial flow diagram of another alternative embodiment of the process of the present invention utilized to reduce the rate of silica deposition upon brine reinjection and to maintain the carbon dioxide partial pressure in the reinjected two-phase brine.

Also, it has been determined that pH is another factor which influences the rate of silica deposition, i.e., a lower pH reduces the rate of silica precipitation from solution. Referring now to FIG. 6, a process schematic is illustrated which utilizes streams of the process schematic of FIG. 2, and alternate embodiments thereof, to lower the pH of the brine to be reinjected and thereby reduce the rate of silica deposition from the brine as amorphous silica in the well and process piping and equipment, and as quartz in the reservoir. The gaseous phase of the produced geothermal brine which is flashed in the wellhead separator (not illustrated in FIG. 6) is transported via conduit 62, as previously described, to scrubber-separator 68. A small amount of condensed steam is separated from the remaining gaseous phase and exits the bottom of scrubber-separator 68 via conduit 70. The gaseous phase is countercurrently scrubbed with steam condensate which is introduced into the scrubber-separator 68 near the top thereof via conduit 54. The condensate scrubber liquid removes deleterious liquid brine constituents and hydrogen sulfide from the gaseous phase, as previously discussed. The spent scrubber liquid exits the bottom of scrubber-separator 68 via conduit 70. The scrubbbed gaseous phase (i.e., the reactor feed gas) exits near the top of scrubber-separator 68 and is conveyed by conduit 66 through a plurality of heat exchanges, as previously disclosed. Air is added via conduit 76 to the heated reactor feed gas in conduit 66 and the mixture enters reactor 80 containing a catalyst, as previously described. Hydrogen sulfide is oxidized to sulfur dioxide and the resultant product gas exits the reactor 80 via conduit 84. The product gas in conduit 84 may be compressed and added to the spent scrubber liquid in conduit 70 thereby allowing the hydrogen sulfide present in the spent scrubber liquid to react with sulfur dioxide in the product gas to form in part, elemental sulfur. Thereafter, the combined two phase stream present in conduit 84 is added to the brine in conduit 32 for reinjection as a two phase fluid into the subterranean geothermal reservoir. As previously disclosed, conduit 84 must be maintained at a temperature above the melting point of elemental sulfur (approximately 260° F.) by any suitable means, such as insulation or heaters so as to prevent plugging of the conduit.

The reinjected two-phase fluid contains a substantial volumentric portion of carbon dioxide in the gaseous phase, as disclosed supra. This carbon dioxide serves to maintain a sufficient carbon dioxide partial pressure in the reinjected two-phase fluid to prevent carbonate scaling upon injection of the two-phase fluid. As previously noted, the two-phase fluid is reinjected at a temperature above the temperature required to maintain silica in solution at the surface. The carbon dioxide and sulfur dioxide in the product gas also serve to lower the pH of the liquid phase of the reinjected brine. As the brine is reinjected into the subterranean geothermal reservoir, it usually will be at a sufficiently low temperature to allow silica to crystallize as quartz within the formation and may drop in temperature enough during injection to permit silica to precipitate as amorphous silica in the well. The low pH of the reinjected brine will sufficiently retard this precipitation and crystallization so that substantially no amorphous silica is precipitated in the well and quartz is formed at a sufficiently remote distance from the injection well to have substantially no effect on injectivity. This system also provides for the reinjection of all the produced fluids, i.e., no gases or liquids are emitted into the atmosphere.

It should be noted that in other embodiments described herein, cleaned vent gas stream in conduit 94 may be compressed and added to the brine reinjection stream to lower the pH thereof and to prevent carbonate scaling upon injection thereof into the subterranean geothermal reservoir. Alternatively, the cleaned vent gas stream may be reinjected into the subterranean reservoir via separate wells to more effectively prevent carbonate scaling at the production well.

As discussed infra, when the gaseous phase and condensate transported via conduit 62 is contacted with spent sulfur dioxide scrubber liquid in scrubber-contactor 68, as illustrated in FIG. 1, and when the spent scrubber liquid in conduit 70 is added to the product gas in conduit 84, as illustrated in FIGS. 2, 3 and 6, hydrogen sulfide reacts with sulfur dioxide to form soluble sulfur products which include, inter alia, elemental sulfur. This reaction is beneficial in that if hydrogen sulfide remains in any condensate stream which is added to the brine stream in conduit 32 for reinjection into the subterranean geothermal reservoir, the hydrogen sulfide will react with any heavy and/or transition metal ions present in the brine to form insoluble heavy and/or transition metal sulfide precipitates. Such precipitates will eventually plug conduit 32 and/or decrease the injectivity of the brine into injection well 38. Preferably, sulfur dioxide will be present in a stoichiometric excess over the amount required to react with the hydrogen sulfide. In such an aqueous solution containing stoichiometric excess of sulfur dioxide, hydrogen sulfide and sulfur dioxide react to form a complex mixture of sulfur-oxygen-hydrogen compounds, which also includes elemental sulfur, known as Wackenroder's liquid. This solution is preferred since all of the hydrogen sulfide is reacted thereby avoiding any subsequent heavy and/or transition metal sulfide precipitation.

As a result, when hydrogen sulfide is present in stoichiometric excess of the sulfur dioxide available for reaction therewith, alternate embodiments must be utilized to insure that substantially no hydrogen sulfide is present in the reinjection brine conveyed in conduit 32. Referring now to the particularly preferred embodiment of the method of this invention illustrated in FIG. 7, when the spent scrubber liquid in conduit 70 is to be added to the product gas in conduit 84 and the spent scrubber liquid in conduit contains a stoichiometric excess of hydrogen sulfide, the spent scrubber liquid is introduced into separator 102 which is maintained at a lower pressure than scrubber-separator 68. In separator 102, the spent scrubber liquid is flashed to a gaseous phase and liquid phase. The saturated gaseous phase which contains, inter alia, approximately 70% of the hydrogen sulfide originally present in the spent scrubber liquid, is added via conduit 104 to the reactor feed gas in conduit 66. The hydrogen sulfide-lean spent scrubber liquid is then added via conduit 106 to the product gas in conduit 84. The amount of flashing in separator 102 necessary to make hydrogen sulfide the limiting reactant will be evident to the skilled artisan cognizant of both the sulfur dioxide content of the product gas and hydrogen sulfide content of the spent scrubber liquid.

When the embodiment of FIG. 1 is utilized and when the gaseous phase in conduit 62 contains a stoichiometric excess of hydrogen sulfide, the gaseous phase may be introduced into scrubber separator 68 at a location above that which spent sulfur dioxide scrubber liquid is introduced thereinto (not illustrated). In this manner, the gaseous phase, which contains a substantial portion of the hydrogen sulfide present in conduit 62, exits near the top of scrubber-separator without contacting the spent sulfur dioxide scrubber liquid. The condensate contacts the spent sulfur dioxide scrubber liquid thereby forming a liquid in which hydrogen sulfide is the limiting reactant. This liquid then exits the bottom of scrubber-separator 68 via conduit 70. Since the gaseous phase is not scrubbed and, therefore, contains deleterious brine constituents, such as chlorine, the gaseous phase in conduit 66 must be scrubbed in any suitable manner prior to passing through heat exchanger 72. For example, the gaseous phase may be introduced into a suitable scrubber (not illustrated) and countercurrently scrubbed with condensate from conduit 54. Other alternative embodiments, necessitated by hydrogen sulfide initially being an excess reactant as described supra, are included within the scope of the present invention.

As previously discussed, the spent sulfur dioxide scrubber liquid is mixed with the brine in conduit 32 and reinjected into the subterranean geothermal reservoir. However, since the geothermal reservoir is often a reducing environment, the sulfur dioxide present in the reinjected brine mixture may be reduced in the subterranean geothermal reservoir and, consequently, hydrogen sulfide may be formed. Thus, over a period of time, hydrogen sulfide formed in situ as a result of sulfur dioxide reinjection may be produced via production well 10.

Figure 8:
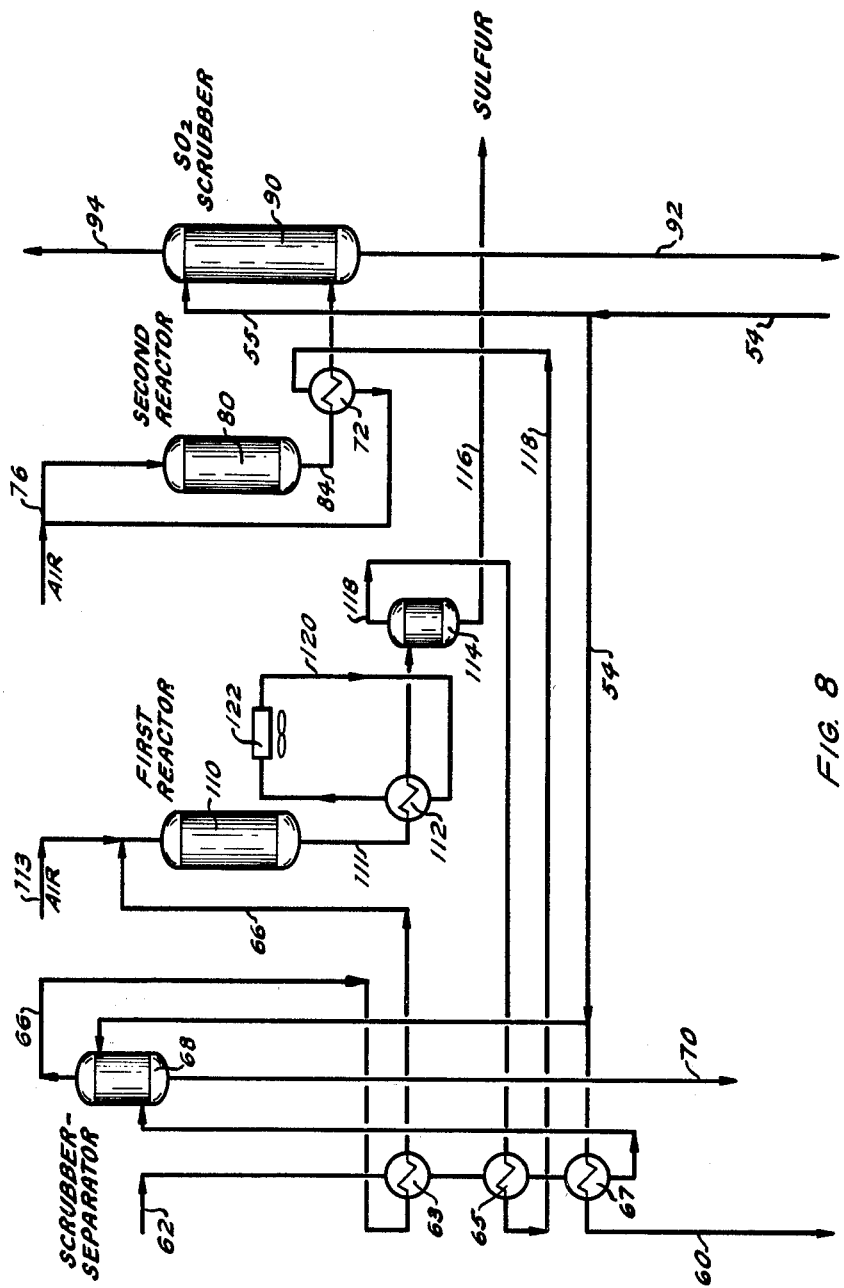
FIG. 8 is a schematic, partial flow diagram of a further alternative embodiment of the present invention by which sulfur dioxide reduction in situ is substantially eliminated.

Turning now to FIG. 8, an alternative, partial process schematic of the present invention is illustrated which embodies appropriate measures necessary to substantially eliminate sulfur dioxide reduction in situ. The gaseous phase flashed from the produced geothermal brine is conveyed in conduit 62 and heats three different streams, as hereinafter described, by any suitable means, such as heat exchangers 63, 65 and 67. This fluid is then introduced into scrubber-separator 68 and is countercurrently contacted with condensate from conduit 54, as previously described. The spent scrubbing liquid (i.e. condensate) is transported via conduit 70 and added to the spent sulfur dioxide scrubber liquid in conduit 92 for reinjection into the subterranean geothermal reservoir. Steam and non-condensible gases, including hydrogen-sulfide, in conduit 66 are heated by the incoming gaseous phase in heat exchanger 63, are combined with air provided through conduit 113 and introduced into the first reactor 110. Air is added in an amount sufficient to provide 1 mole of oxygen for every mole of hydrogen sulfide present in the non-condensible gases. In this manner, elemental sulfur is formed in accordance with reaction (2) hereinafter described. Reactor 110 contains a suitable catalyst which will oxidize hydrogen sulfide in the feed stream to elemental sulfur. An example of a suitable catalyst is one comprising one or more vanadium oxides and/or sulfides supported on a high surface area amorphous silica-alumina base, as disclosed supra. Hydrogen sulfide is converted to elemental sulfur in accordance with the following general reaction:

$$2H_2S + O_2 \rightarrow S_2 + 2H_2O \qquad (2)$$

Water formed in accordance with the above reaction will be present as steam at the temperatures involved. The product gas exits reactor 110 via conduit 111 and is cooled in heat exchanger 112 to a temperature below the dew point of elemental sulfur but above the melting point thereof. The product gas is cooled to this temperature in heat exchanger 112 by indirect heat exchange with water conveyed in closed conduit loop 120. After the water in conduit loop 120 is heated in heat exchanger 112, the water is cooled by any suitable means, such as air cooler 122, to a temperature sufficiently low to cool the gas product stream passing through heat exchanger 112 to below the dew point of elemental sulfur but above the melting point thereof. The manner of operating this closed loop heat exchange will be evident to the skilled artisan. The cooled product gas stream is introduced into separator 114 wherein substantially all of the elemental sulfur originally present in the product gas exits flash vessel 114 in the liquid phase via conduit 116. The liquid sulfur in conduit 116 may be utilized in any desirable manner.

The remaining product gas exits near the top of separator 114 via conduit 118, is heated in heat exchanger 65 and then is treated in second reactor 80, as previously described. A small proportion of hydrogen sulfide will not be converted to elemental sulfur in reactor 110, for example approximately 25%, and therefore, will need to be converted to sulfur dioxide in reactor 80. As a result, the spent sulfur dioxide scrubber liquid, in conduit 92 which is reinjected into the subterranean geothermal reservoir contains only a relative small amount of sulfur dioxide compared to other alternative embodiments described herein. Further, the spent scrubber liquid containing hydrogen sulfide in conduit 70 is preferably added to the product gas stream in conduit 84 prior to introduction into the sulfur dioxide scrubber 90 as previously illustrated or is introduced into the sulfur dioxide scrubber 90 at a location above the introduction of the product gas stream thereinto so as to react hydrogen sulfide and sulfur dioxide as previously described. If the sulfur dioxide present in the spent sulfur dioxide scrubber liquid is not the excess reactant with respect to the hydrogen sulfide present in conduit 70, the embodiment illustrated in FIG. 7 must be integrated herewith so that sulfur dioxide in conduit 92 will be the excess reactant. In the manner thus described, the sulfur dioxide content of the reinjected geothermal brine is sufficiently lowered to render any in situ hydrogen sulfide formation due to brine reinjection negligible.

Figure 7:
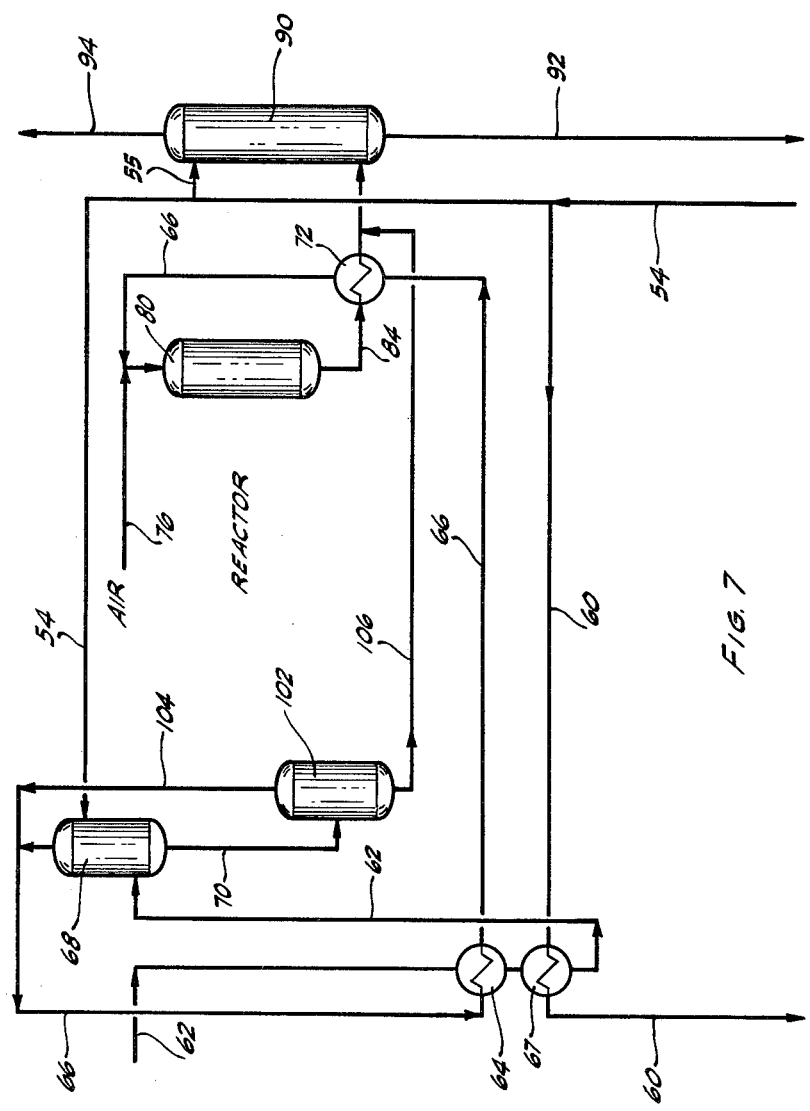
FIG. 7 is a schematic, partial flow diagram of still another alternative embodiment of the process of the present invention which insures the sulfur dioxide is present in stoichiometric excess over hydrogen sulfide in the combined brine reinjection streams.

The product gas in conduit 118 may have a sufficiently low hydrogen sulfide content to render it environmentally acceptable for discharge directly to the atmosphere. In such instance, the second reactor, sulfur dioxide scrubber and associated process piping and equipment are eliminated. The hydrogen sulfide concentration of the spent scrubber liquid in conduit 70 must then be reduced to a concentration sufficiently low to provide that any precipitates resulting from addition thereof to the brine reinjection stream in conduit 32 can be tolerated without incurring any increase in maintenance. The hydrogen sulfide content may be so reduced by utilizing another separator (as shown in FIG. 7) or by augmenting separation with any available stripping gas (not illustrated).

In practicing the present invention, it is important to appreciate certain trade-offs. For example, in the embodiments illustrated in FIGS. 1 and 2, the amount of hydrogen sulfide oxidized by addition of an oxidant to the produced geothermal brine must be tempered by the amount of corrosion and scaling which can be tolerated downstream, as well as the cost of constructing downstream process piping and equipment with corrosion resistant material. As another example, the improved removal of hydrogen sulfide achieved by embodiments such as those illustrated in FIGS. 3 and 4, must be balanced against the pollution control required of the gaseous vent stream from surge drum 50. Also, it may be desirable to achieve any applicable pollution abatement requirements by combining the vent gas in conduit 52 with the reactor feed gas in conduit 66 in lieu of improved wellhead abatement offered by the embodiments of FIGS. 3 and 4. Again, any elimination of the improved wellhead abatement of the embodiments illustrated in FIGS. 3 and 4 must be tempered by the amount of corrosion and scaling which can be tolerated downstream.

The following example is illustrative of the application of the present invention to treating and deriving useful energy from produced geothermal brines. Since this example is illustrative of only one embodiment of the present invention, it is not to be construed as limiting the scope thereof.

EXAMPLE

Geothermal brine is produced from a subterranean geothermal reservoir to the wellhead at a temperature of about 445° F. and at a pressure of about 460 p.s.i.g. The geothermal brine is produced as a two-phase fluid from the subterranean reservoir at a rate of 1 million pounds of brine per hour via production wells communicating therewith. Non-condensible gas is produced in the brine (both in the liquid and gaseous phase) at a rate of 555 mols per hour, and more specifically hydrogen sulfide is produced at a rate of 45 pounds per hour, carbon dioxide at 23,900 pounds per hour, hydrogen at 0.4 pounds per hour and methane at 167 pounds per hour.

Air is added to the produced geothermal brine at a rate of 183 pounds per hour to oxidize hydrogen sulfide to intermediate oxidation states, such as thiosulfate.

The oxidized brine is transported to two wellhead separators connected for brine flow in series therethrough as illustrated in FIG. 4. The separated gaseous streams (non-condensible gases and steam) from both wellhead separators are combined in conduit 62 into one gaseous stream at a temperature of about 435° F. and a pressure of about 400 p.s.i.g. This gaseous stream flows at a rate of 110,800 pounds per hour, and more specifically the hydrogen sulfide flow rate is 21.4 pounds per hour and the carbon dioxide flow rate is 22,700 pounds per hour. As illustrated in FIG. 7, this gaseous stream heats the incoming reactor feed gas in exchanger 64, is partially condensed in exchanger 67, and then is introduced into high pressure separator 68 wherein 93 wt.% of the hydrogen sulfide is removed in the gaseous stream, with the remaining 7 wt.% being drawn off the bottom of high pressure separator 68 with the condensate. The gaseous stream is removed from the high pressure separator via conduit 66 at a rate of 23,500 pounds per hour and at a temperature of about 200° F. and pressure of about 375 p.s.i.g. There are 19.1 pounds per hour hydrogen sulfide flowing in the gaseous stream and 22,900 pounds per hour carbon dioxide. The condensate from high pressure separator 68, having a hydrogen sulfide flow rate of 2.3 pounds per hour, is introduced to low pressure separator 102 wherein 1.4 pounds per hour of hydrogen sulfide, along with other non-condensible gases, are separated from the condensate and combined in conduit 66 with the gaseous stream from high pressure separator 68 to form a reactor feed gas stream.

The reactor feed gas stream flows through conduit 66 at a rate of 24,200 pounds per hour, at a temperature of about 200° F. and a pressure of about 45 p.s.i.g. The hydrogen sulfide flow rate in the reactor feed gas stream is 20.5 pounds per hour and the carbon dioxide flow rate is 23,550 pounds per hour. The feed gas stream is heated by indirect heat exchange in exchangers 64 and 72 with the gaseous stream from the wellhead separators and reactor product gas, respectively. Air at a temperature and pressure of about 60° F. and about 40 p.s.i.g. is added to the heated feed gas stream at a rate of 187 pounds per hour. The air is added in an amount to provide a 50% molar excess of oxygen stoichiometrically required to oxidize hydrogen sulfide to sulfur dioxide thereby insuring the formation of sulfur dioxide in lieu of elemental sulfur. Upon entry into reactor 80, the feed gas is at a temperature of about 450° F. and a pressure of about 30 p.s.i.g.

The air and reactor feed gas are passed at a rate of 24,350 pounds per hour over a packed bed of vanadium oxide catalyst supported on a high surface area amorphous silica-alumina base in reactor 80, wherein substantially all of the hydrogen sulfide present in the feed gas is converted to sulfur dioxide. The reactor product gas exits the bottom of the reactor through conduit 84 at a temperature and pressure of about 473° F. and about 30 p.s.i.g. The hydrogen sulfide content of the product gas is less than 15 ppm and the sulfur dioxide flow rate is 39 pounds per hour. As the vanadium catalyst deactivates, the feed gas inlet temperature is increased to provide for uniform conversion of hydrogen sulfide to sulfur dioxide. After the inlet temperature is increased 100° F. the spent catalyst is removed from the reactor and a new catalyst bed is utilized.

The reactor product gas is passed in indirect heat exchange with the reactor feed gas in exchanger 72, and then is introduced into sulfur dioxide absorption tower 90 near the bottom thereof. The condensate from the low pressure separator containing 0.9 pounds per hour of hydrogen sulfide is introduced into the sulfur dioxide scrubber at a location just above the introduction of product gas thereinto. The product gas is countercurrently scrubbed in scrubber 90 with condensate from the steam turbine (hereinafter described) to remove approximately 96% of the sulfur dioxide therefrom. In addition, the hydrogen sulfide in the low pressure condensate reacts with the sulfur dioxide to form soluble sulfur compounds (i.e., Wackenroder's liquid). The condensate and scrubber liquid exit the bottom of the sulfur dioxide scrubber at a rate of 117,400 pounds per hour and at a temperature and pressure of about 187° F. and about 15 p.s.i.g. The cleaned product gas exits to the atmosphere via conduit 94 near the top of the sulfur dioxide scrubber at a temperature and pressure of about 150° F. and about 15 p.s.i.g. and has a sulfur dioxide flow rate of 1.54 pounds per hour.

The liquid phase from the wellhead separators is flashed across a conventional motor valve to a high quality steam and then is introduced into separator 28. As illustrated in FIG. 2, the high quality steam is drawn off the top of separator 28 and is countercurrently scrubbed in scrubber vessel 40 with turbine condensate to remove sodium chloride therefrom. The high quality steam thereafter drives condensing turbine 44. The resulting condensate is collected in drum 50 at a temperature and pressure of about 130° F. and about 15 p.s.i.a. The steam condensate is withdrawn from drum 50, is pressurized to about 150 p.s.i.g., and then is utilized as scrubber liquid for sulfur dioxide scrubber 90 and high quality steam scrubber 28.

The remaining brine from separator 28 is combined with any excess condensate, spent high quality steam scrubber liquid and sulfur dioxide scrubber liquid, and is pumped to injection wells communicating with the subterranean geothermal reservoir for reinjection.

It is worthy to note that the hydrogen sulfide flow rate in the liquid phase is 1.1 pounds per hour. From this figure it is calculated that an ⅛"-3/16" heavy and/or transition metal sulfide scale buildup will accumulate in the brine-carrying conduits downstream of the wellhead separators per year. Such scale buildup is easily tolerated and taken care of a normal process system maintenance.

Even though the present invention has been described as a process for treating and deriving useful energy from geothermal brines, the process of the present invention is not limited in application to geothermal brines but may be applicable to any hot brine possessing the characteristics described herein.

While particular embodiments of the invention have been described it will be understood, of course, that the invention is not limited thereto since many obvious modifications can be made, and it is intended to include within this invention any such modifications as will fall within the scope of the appended claims.

Having now described the invention, I claim:

1. A process for treating and deriving useful energy from a two-phase geothermal brine produced from a subterranean geothermal reservoir, said two-phase geothermal brine containing non-condensible gases, including hydrogen sulfide, and also containing heavy and/or transition metals in solution, the process comprising:
    (a) separating said non-condensible gases from said produced geothermal brine, thereby separating a substantial majority of said hydrogen sulfide from said geothermal brine;
    (b) flashing a portion of said separated geothermal brine to a high quality steam;
    (c) deriving useful energy from said high quality steam;
    (d) converting substantially all of said hydrogen sulfide separated from said geothermal brine with said non-condensible gases to sulfur and/or other sulfur compounds of a higher oxidized state;
    (e) removing a portion of said sulfur and/or other sulfur compounds of a higher oxidized state from said non-condensible gases to form an environmentally acceptable vent gas;
    (f) discharging at least a portion of said environmentally acceptable vent gas to the atmosphere;
    (g) mixing said portion of saod sulfur and/or sulfur compounds of a higher oxidized state with the geothermal brine remaining after step (b); and
    (h) injecting the mixture formed in step (g) into said subterranean geothermal reservoir.

2. The process defined in claim 1 wherein said produced geothermal brine further contains silica in solution and said geothermal brine is maintained at a temperature above the temperature required to maintain silica in solution.

3. The process defined in claim 1 wherein during step (d) said hydrogen sulfide is catalytically converted to sulfur dioxide.

4. The process defined in claim 1 wherein prior to separating non-condensible gases from said geothermal brine in step (a) the process further comprises the step of adding an oxidant to said two-phase geothermal brine to oxidize at least a portion of said hydrogen sulfide.

5. The process defined in claim 1 further comprising the step of, prior to step (d), contacting said separated non-condensible gases containing hydrogen sulfide with a selected scrubber liquid to remove entrained brine constituents and a minor portion of the hydrogen sulfide therefrom; and combining the scrubber liquid containing said minor portion of hydrogen sulfide and brine constituents with the mixture injected in step (h), the composition of said scrubber liquid being selected such that said minor portion of hydrogen sulfide is converted to sulfur and/or sulfur compounds of a higher oxidized state, thereby avoiding the formation of heavy and/or transition metal sulfides in the mixture injected in step (h).

6. A process for treating and deriving useful energy from a two-phase geothermal brine produced from a subterranean geothermal reservoir, containing non-condensible gases, including hydrogen sulfide, and also containing heavy and/or transition metals in solution, which comprises:
    (a) separating steam and said non-condensible gases from said produced geothermal brine;
    (b) flashing a portion of said produced geothermal brine to a high quality steam;
    (c) separating said high quality steam from the remaining geothermal brine;
    (d) deriving useful energy from said high quality steam;
    (e) cooling said steam and non-condensible gases separated from said produced geothermal brine in step (a), thereby condensing a portion of the steam;
    (f) separating said condensed portion from said non-condensible gases and uncondensed steam;
    (g) contacting said non-condensible gases and uncondensed steam with a scrubber liquid thereby removing deleterious brine constituents and a portion of the hydrogen sulfide from said separated non-condensible gases and uncondensed steam;
    (h) converting substantially all the hydrogen sulfide present in said separated non-condensible gases and uncondensed steam to sulfur dioxide, thereby forming a product gas containing sulfur dioxide;
    (i) removing a portion of said sulfur dioxide from said product gas while condensing substantially all of the remaining uncondensed steam, thereby forming an environmentally acceptable vent gas;
    (j) discharging at least a first portion of said environmentally acceptable vent gas to the atmosphere;
    (k) mixing said condensed portion and said scrubber liquid containing deleterious brine constituents and hydrogen sulfide;
    (l) contacting the mixture of (k) containing hydrogen sulfide with a stoichiometric excess of sulfur dioxide formed in (h) to produce a fluid mixture substantially free of hydrogen sulfide;
    (m) adding the mixture of (l) to the remaining geothermal brine of (c); and
    (n) injecting the mixture formed in (m) into said subterranean geothermal reservoir.

7. The process defined in claim 6 wherein step (d) is performed by scrubbing said high quality steam with a liquid to remove deleterious brine constituents in said high quality steam, and utilizing said scrubbed high quality steam to drive a turbine which drives an electrical generator, said scrubbed high quality steam exiting the turbine being condensed to form a high quality steam condensate.

8. The process defined in claim 7 wherein step (i) is performed by scrubbing said product gas with at least a portion of said high quality steam condensate to remove substantially all of said sulfur dioxide.

9. The process defined in claim 8 wherein at least a portion of the high quality steam condensate containing sulfur dioxide formed in step (i) is then utilized as the scrubber liquid in step (g).

10. The process defined in claim 8 wherein at least a second portion of said high quality steam condensate is utilized as the scrubber liquid in step (g) and wherein the high quality steam condensate containing sulfur dioxide formed in (i) is added to the mixture formed in step (m).

11. The process defined in claim 10 wherein step (l) is performed by adding the mixture formed in step (k) to said product gas.

12. The process defined in claim 8 wherein said produced geothermal brine further contains silica in solution and said produced geothermal brine and mixtures therewith are maintained at a temperature above the temperature required to keep silica in solution.

13. The process defined in claim 6 wherein said hydrogen sulfide is catalytically converted to sulfur dioxide.

14. The process defined in claim 6 further comprising the step of, prior to step (a), adding an oxidant to said two-phase geothermal brine to oxidize at least a portion of the hydrogen sulfide contained therein.

15. The process of claim 6 wherein prior step (h), the process further includes the steps of converting a substantial portion of the hydrogen sulfide present in said separated non-condensible gases and uncondensed steam to elemental sulfur; and separating said elemental sulfur from said separated non-condensible gases and uncondensed steam.

16. The process defined in claim 6 further including the steps of, prior to step (b), countercurrently contacting said produced geothermal brine containing non-condensible gases with a second portion of said environmentally acceptable vent gas thereby stripping residual non-condensible gases from said produced geothermal brine; and thereafter adding the gases thus stripped from said produced geothermal brine to said separated steam and non-condensible gases prior to step (e).

17. A process for treating and deriving useful energy from a two-phase geothermal brine produced from a subterranean geothermal reservoir, containing non-condensible gases, including hydrogen sulfide, and also containing heavy and/or transition metals in solution, which comprises:
(a) separating steam and said non-condensible gases from said produced geothermal brine;
(b) flashing a portion of said produced geothermal brine to a high quality steam;
(c) separating said high quality steam from the remaining geothermal brine;
(d) deriving useful energy from said high quality steam;
(e) cooling said steam and non-condensible gases separated from said produced geothermal brine in step (a) thereby condensing a portion of the steam;
(f) separating said condensed portion from said non-condensible gases and uncondensed steam;
(g) contacting said non-condensible gases and uncondensed steam with a scrubber liquid thereby removing deleterious brine constituents and a portion of the hydrogen sulfide from said separated non-condensible gases and uncondensed steam;
(h) mixing said condensed portion and said scrubber liquid containing deleterious brine constituents and said portion of the hydrogen sulfide;
(i) separating substantially all of said portion of hydrogen sulfide form the mixture formed in step (h) to form a liquid mixture having trace amounts of hydrogen sulfide;
(j) adding said portion of hydrogen sulfide to the separated non-condensible gases and uncondensed steam from step (g) to form a feed gas;
(k) converting substantially all the hydrogen sulfide present in said feed gas to sulfur dioxide, thereby forming a product gas containing sulfur dioxide and uncondensed steam;
(l) removing substantially all of said sulfur dioxide from said product gas, while condensing substantially all of said uncondensed steam, thereby forming an environmentally acceptable vent gas;
(m) discharging at least a portion of said environmentally acceptable vent gas to the atmosphere;
(n) contacting the liquid mixture from step (i) with a stoichiometric excess of the sulfur dioxide formed in (k) to form a fluid mixture substantially free of hydrogen sulfide;
(o) adding the fluid mixture formed in step (n) to the remaining geothermal brine of step (c); and
(p) injecting the mixture formed in step (o) into said subterranean geothermal reservoir.

18. The process defined in claim 17 wherein step (d) is performed by scrubbing said high quality steam with a liquid to remove deleterious brine constituents entrained in said high quality steam, and utilizing said scrubbed high quality steam to operate a turbine which drives an electrical generator, said scrubbed high quality steam being condensed to form a high quality steam condensate.

19. The process defined in claim 18 wherein step (l) is performed by scrubbing said product gas with at least a first portion of said high quality steam condensate to remove substantially all of said sulfur dioxide.

20. The process defined in claim 19 wherein a second portion of said condensed high quality steam is utilized as the scrubber liquid in step (g) and wherein the high quality steam condensate containing sulfur dioxide formed in (l) is added to the mixture formed in step (o).

21. The process defined in claim 20 wherein step (n) is performed by adding the liquid mixture formed in step (i) to said product gas.

22. The process defined in claim 19 wherein said produced geothermal brine further contains silica in solution and said produced geothermal brine and mixtures therewith are maintained at a temperature above the temperature required to keep silica in solution.

23. The process of claim 17 wherein said hydrogen sulfide is catalytically converted to sulfur dioxide in step (k).

24. The process of claim 17 further comprising the step of, prior to step (a), adding an oxidant to said two-phase geothermal brine to oxidize at least a portion of the hydrogen sulfide contained therein.

25. The process of claim 17 wherein the separation of step (a) is performed in two gas-liquid separators connected in series for brine flow therethrough.

26. A process for treating and deriving useful energy from a two-phase geothermal brine produced from a subterranean geothermal reservoir, containing non-condensible gases, including hydrogen sulfide and carbon dioxide, and also containing heavy and/or transition metals in solution, which comprises:
  (a) separating steam and said non-condensible gases from said produced geothermal brine;
  (b) flashing a portion of said produced geothermal brine to a high quality steam;
  (c) separating said high quality steam from the produced geothermal brine;
  (d) deriving useful energy from said high quality steam;
  (e) cooling said steam and non-condensible gases separated from said produced geothermal brine in step (a) thereby condensing a portion of the steam;
  (f) separating said condensed portion from said non-condensible gases and uncondensed steam;
  (g) contacting said non-condensible gases and uncondensed steam with a scrubber liquid thereby removing deleterious brine constituents and a portion of the hydrogen sulfide from said separated non-condensible gases and uncondensed steam;
  (h) catalytically converting substantially all the hydrogen sulfide present in said separated non-condensible gases and uncondensed steam to sulfur dioxide, thereby forming a product gas containing sulfur dioxide and carbon dioxide;
  (i) mixing said condensed portion and said scrubber liquid containing deleterious brine constituents to form a liquid mixture containing hydrogen sulfide;
  (j) adding the liquid mixture formed in step (i) to a selected portion of said product gas having a stiochiometric excess of sulfur dioxide;
  (k) adding the mixture formed in step (j) to the remaining produced geothermal brine from step (c);
  (l) injecting the mixture formed in step (k) into said subterranean geothermal reservoir, said portion of said product gas being selected to provide a sufficient carbon dioxide partial pressure in the injected mixture to substantially eliminate carbonate scaling during injection thereof.

27. The process defined in claim 26 wherein said produced geothermal brine further contains silica in solution and said produced geothermal brine and mixtures therewith are maintained at a temperature above the temperature required to maintain silica in solution.

* * * * *